(12) United States Patent
Moomjian et al.

(10) Patent No.: US 11,341,685 B2
(45) Date of Patent: May 24, 2022

(54) COLOR-MATCHING BODY PART TO LIP PRODUCT

(71) Applicant: NipLips, LLC, Tucson, AZ (US)

(72) Inventors: Renae Moomjian, Tucson, AZ (US); Roger Vogel, Rancho Mission Viejo, CA (US)

(73) Assignee: NIPLIPS, LLC, Tucson, AZ (US)

( * ) Notice: Subject to any disclaimer, the term of this patent is extended or adjusted under 35 U.S.C. 154(b) by 110 days.

(21) Appl. No.: 16/864,992

(22) Filed: May 1, 2020

(65) Prior Publication Data

US 2020/0349739 A1 Nov. 5, 2020

Related U.S. Application Data

(60) Provisional application No. 62/920,493, filed on May 3, 2019.

(51) Int. Cl.
| | | |
|---|---|---|
| *G06T 7/90* | (2017.01) | |
| *A45D 40/20* | (2006.01) | |
| *G06V 40/10* | (2022.01) | |
| *A45D 40/00* | (2006.01) | |

(52) U.S. Cl.
CPC ................ *G06T 7/90* (2017.01); *A45D 40/20* (2013.01); *G06V 40/10* (2022.01); *A45D 2040/0025* (2013.01); *G06T 2207/10024* (2013.01); *G06T 2207/30004* (2013.01)

(58) Field of Classification Search
CPC ............. G06T 7/90; G06T 2207/10024; G06T 2207/30004; A45D 40/20; A45D 2040/0025; A45D 44/005; G06K 9/00362; G06K 9/4652
USPC ......................................................... 382/162
See application file for complete search history.

(56) References Cited

U.S. PATENT DOCUMENTS

| | | | | |
|---|---|---|---|---|
| 4,401,492 | A * | 8/1983 | Pfrommer ................. | A61F 2/52 156/145 |
| 6,177,093 | B1 * | 1/2001 | Lombardi ................ | A61K 8/00 424/401 |
| 8,548,257 | B2 * | 10/2013 | Reid ................... | G06K 9/00228 382/224 |
| 11,030,917 | B2 * | 6/2021 | Wexler ............... | G06K 9/00369 |
| 2008/0314776 | A1 * | 12/2008 | Cooke .................... | A61J 11/005 206/223 |
| 2009/0231356 | A1 * | 9/2009 | Barnes ................ | G06F 3/04883 345/594 |
| 2013/0343647 | A1 * | 12/2013 | Aoki .................... | G06K 9/4652 382/165 |
| 2018/0126342 | A1 * | 5/2018 | Kent ..................... | G01J 3/0272 |

* cited by examiner

*Primary Examiner* — Ali Bayat
(74) *Attorney, Agent, or Firm* — Boardman & Clark LLP

(57) ABSTRACT

A method of color-matching a body part, such as a nipple of a human breast, to a lip product, such as a lipstick, comprises receiving an image of the body part, determining a color of the body part, and choosing a color of the lip product (e.g., the lipstick) that corresponds to the color of the body part (e.g., the nipple).

15 Claims, 1 Drawing Sheet

COLOR-MATCHING BODY PART TO LIP PRODUCT

CROSS-REFERENCE TO RELATED APPLICATIONS

This application/patent claims priority to, and benefit of, U.S. Provisional Pat. No. 62/920,493, which was filed on May 3, 2019 and entitled "Apparatus and Method for Personalized Color Matching Lipstick to Nipple Color," the entirety of which is incorporated herein by reference.

FIELD

In general, the present disclosure relates to beauty products and cosmetics, and, more specifically, to color-matching body or lip products, such as lip balm, lipstick, and/or other, to various body parts, such as skin or nipples.

BACKGROUND

In various contexts, beauty is a characteristic present in a person, place, or thing, capable of exposing meaning, pleasure, and/or satisfaction to the human eye, mind, and/or other. In various contexts, beauty arises from sensory manifestations, such as by various arrangements, colors, designs, personalities, rhythms, shapes, sounds, symmetries, textures, etc. In various contexts, beauty is a part of aesthetics, culture, psychology, and/or sociology. Beauty, as a cultural creation, can also be commercialized.

In a subjective sense, individual beauty can be determined by characteristics that are perceived in such a way as to provide the viewer with an internal feeling of attraction, happiness, satisfaction, and/or well-being. In this sense, different persons, places, and things are perceived as beautiful by different individuals—that is, beauty is often in the eye of the beholder.

In an objective sense, individual beauty can be determined by characteristics that are calculable, determinable, and/or measurable.

In facial beauty, a woman [for the purposes of this disclosure, the female persona is used hereinafter, although at least age, gender, sexuality, and race-neutrality (and the like) is contemplated] can enhance her natural beauty by accentuating her lips, including by applying products such as a chapstick or lip balm, cosmetics, gloss, jelly, lipstick, liner, lotion, salve, stain, and/or wax topically thereto. Many such products provide an occlusive layer on a woman's lips, to which colors, dyes, emollients, flavors, fragrances, lotions, pigments, oils, and/or waxes can be added to enhance their aesthetic and/or functional effectiveness and/or properties. Many such products can be applied by a brush or extruded from a tube. For the purposes of this disclosure, all such products will be generically referred to as lipstick, although the inventive arrangements are not limited thereto.

When purchasing lipstick, a woman may be confronted with a time consuming and unsatisfactory process. For example, many women have long attempted to find a color that captures a look they intend to portray at a particular place and time. Accordingly, finding and using a preferred color lipstick has generated frustration for generations of women. Moreover, even if personalized or specially tailored cosmetics [e.g., lipstick] corresponded to the exact demands of a particular customer, women might not know what color/shade to seek.

SUMMARY

In various embodiments, a method of color-matching a body part to a lip product comprises receiving an image of the body part; determining a color of the body part; and choosing a color of the lip product that corresponds to the color of the body part.

In various embodiments, the body part is a nipple of a breast; and/or the color of the nipple is distinguished from a color of an areola of the breast in order to the determine the color of the nipple; and/or the lip product comprises lipstick; and/or the color of the body part comprises three bytes of information, comprising its red, green, and blue values; and/or the color of the body part comprises four bytes of information, comprising its red, green, blue, and transparency values; and/or the image of the body part is received from a hand-held device; and/or the hand-held device is a cell phone; and/or the method further comprises using a hand-held device to capture the image of the body part; and/or the method further comprises discarding the image of the body part after the color of the body part is determined; and/or the body part is a nipple of a breast and the lip product comprises lipstick; and/or the color of the lip product matches the color of the body part; and/or the color of the lip product is chosen from a stock of colors of the lip products; and/or the method further comprised receiving multiple images of the body part; and/or the method further comprises receiving multiple images of the body part under various lighting conditions of the body part; and/or the color of the body part is determined using an algorithm related to the body part and to the lip product; and/or a computing device is configured to receive the image of the body part, a computer algorithm is configured to determine the color of the body part, and the computing device is configured to determine the color of the lip product; and/or a user uses a computing device to image the body part, a computer algorithm is configured to determine the color of the body part, and the computing device is configured to determine the color of the lip product.

In various embodiments, a computer-implemented method of color-matching a body part to a lip product comprises receiving an image of the body part; determining a color of the body part; and choosing a color of the lip product that corresponds to the color of the body part.

In various embodiments, a non-transitory computer-readable medium embodies program code executable in at least one computing device, the program code, when executed by the at least one computing device, is configured to cause the at least one computing device to at least receive an image of the body part; determine a color of the body part; and choose a color of the lip product that corresponds to the color of the body part.

BRIEF DESCRIPTION OF THE DRAWINGS

The accompanying drawings illustrate various embodiments employing the principles described herein and are a part of this specification. The illustrated embodiments are meant for description only, and they do not limit the scope of the claims, and in which:

DETAILED DESCRIPTION

This detailed description of exemplary embodiments references the accompanying drawings, which show exemplary embodiments by way of illustration. While these exemplary embodiments are described in sufficient detail to enable those skilled in the art to practice this disclosure, it should be understood that other embodiments may be realized and that logical changes and adaptations in construction and design may be made in accordance with said disclosure and the teachings herein described without departing from the scope and spirit hereof. Thus, this detailed description is presented for purposes of illustration only and not of limitation.

In various embodiments, a preferred color lipstick for a woman matches the natural color of her nipple. That is, in various embodiments, a lipstick color that matches the color of a woman's nipple accentuates her lips in a preferred way. Accordingly, matching a lipstick color to a nipple color is hereby enabled.

Figure 1:
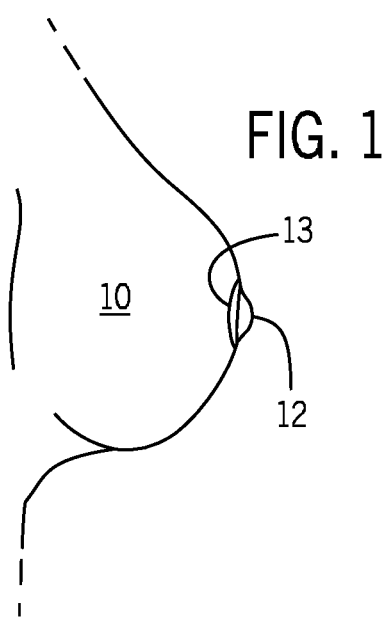
FIG. 1 illustrates a simplified side view of a body part, in accordance with various body parts.

More specifically, and referring now to FIG. 1, a woman's body part, such as a breast 10, contains a protuberance at a distal end thereof, such as a nipple 12. In various embodiments, the nipple 12 is a particular color, inherent to the woman having the breast 10. In various embodiments, the color of the nipple 12 may change, or appear to change, over time. In various embodiments, the color of the nipple 12 may appear to be, or is, different under different lighting conditions/scenarios. In various embodiments, the color of the nipple 12 is a particular color under a particular lighting condition/scenario, such as under ambient lighting conditions. In various embodiments, there are color gradations or variations within the nipple 12. In various embodiments, the nipple 12 contains a dominant or primary color. In various embodiments, the nipple 12 contains one or more dominant or primary colors. In various embodiments, the nipple 12 contains at least one dominant or primary color.

Figure 2:
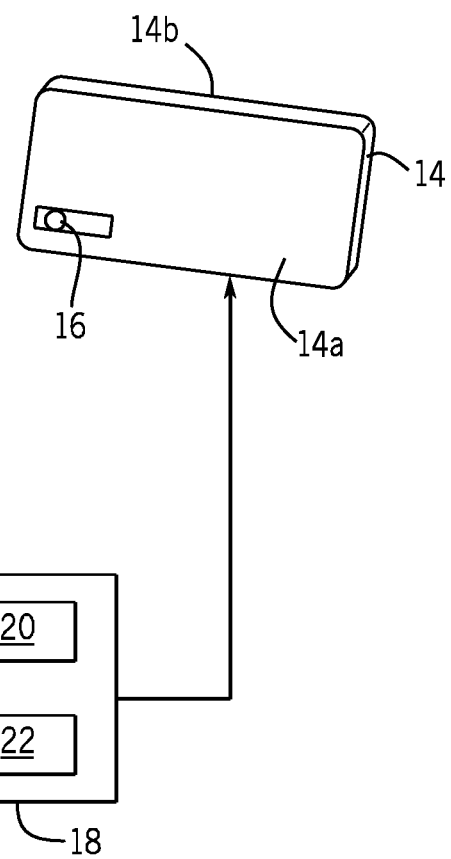
FIG. 2 illustrates simplified computer componentry in a hand-held device, in accordance with various embodiments.

Referring now to FIG. 2, at a distance apart from the nipple 12 of FIG. 1, a device 14 comprises an imaging component 16, in various embodiments. In various embodiments, the device 14 is a cell phone or computer or computing pad or computing device or the like, and the imaging component 16 is an imager, such as a camera and/or lens. In various embodiments, the device 14 comprises a first side 14a and a second side 14b that is distal, opposing, and spaced apart from the first side 14a. In various embodiments, the imaging component 16 is carried and/or supported by the first side 14a of the device 14. In various embodiments, the device 14 is a computing device, a handheld device, a device capable of and configured to capture an image, and/or various combinations thereof and/or the like.

By interaction of the nipple 12 of the breast 10 with the imaging component 16 of the device 14, a color of the nipple 12 can be determined by the device 14 and/or a user of the device 16, such as the women having the breast 10 and/or another person, persons, or other.

Referring still to FIG. 2, computer componentry 18 comprises one or more controllers 20 (aka processors) configured to operate with one or more internal, tangible, non-transitory memories 22, the memories 22 being capable of implementing digital or programmatic logic, in various embodiments. In various embodiments, the controllers 20 comprise one or more of an application-specific integrated circuit (ASIC), digital signal processor (DSP), field programming gate array (FPGA), general purpose processor (GPP), microprocessor (MP), and/or other programmable logic device (PLD), discrete gate, transistor logic, or discrete hardware components, or various combinations thereof and/or or the like, and the memories 22 store instructions therein that are implemented by the controller 20 for performing various functions, such as systems and methods enabled by the inventive arrangements described herein.

In various embodiments, the device 14 comprises the computer componentry 18. In various embodiments, the computer componentry 18, and/or at least parts thereof, are housed within the device 14.

In various embodiments, the memories 22 store instructions downloaded remotely from a server, such as the so-called "cloud" and/or other deliver mechanisms.

In various embodiments, the memories 22 store an application—e.g., a computer program—installed thereinto and/or there onto.

In various embodiments, the device 14 is a cellular phone and the memories 22 store an application program (e.g., a so-called "App") downloaded from a remote server, such as the cloud.

In various embodiments, the imaging component 16 is configured to capture images, which images are processed by the controllers 20 and/or stored in the memories 22 and/or temporarily stored in the memories 22.

In various embodiments, the imaging component 16 of FIG. 2 captures the color of the nipple 12 of FIG. 1 under one or more various lighting conditions. In various embodiments, capturing the color of the nipple 12 and creating a lip color product (e.g., a lipstick) that matches that color in ambient light conditions enhances the beauty of a woman's lips and face when the lipstick is applied to lips.

Figure 3:
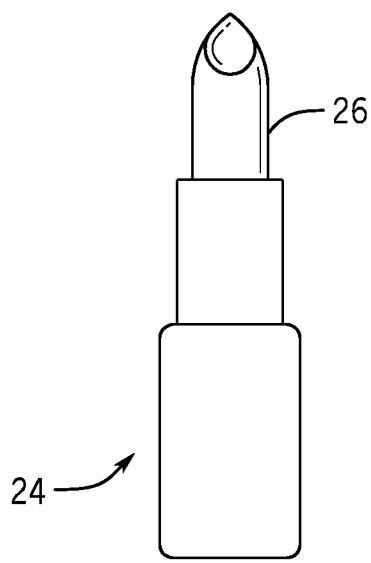
FIG. 3 illustrates a simplified side view of a tube of lipstick, in accordance with various embodiments.

Referring now to FIG. 3, a tube 24 (or canister of some sort or the like) of lipstick 26 is shown, in various embodiments. In various embodiments, the tube 24 is approximately 10 mm (0.393 inches) in diameter and approximately 50 mm (1.969 inches). In various embodiments, the lipstick 26 is shaped as a baton or stick within the tube 24, and the lipstick can be applied by direct contact to a woman's lips and/or by indirect contact to a woman's lips, such as by finger-application of the lipstick to the woman's lips.

In various embodiments, the color of the lipstick 26 within the tube 24 is color-matched to the color of the nipple 12 of FIG. 1, as captured by the imaging component 16 of the device 14 of FIG. 2—such as by a camera on a personal, mobile, and/or cellular phone, and/or other device as well having image-capturing capabilities.

In various embodiments, the imaging component 16 of the device 14 of FIG. 2 captures a still and/or video image of the nipple 12 of the breast 10 of FIG. 1. In various embodiments, the image of the nipple 12 of the breast 10 of FIG. 1 is stored within the memories 22 of the device 14 in FIG. 2.

In various embodiments, the controller 20 of the device 16, operating in conjunction with the memory 22 of the device 16, implements a CIE L*a*b* [aka CIELAB] color space, which expresses color as three (3) values: L* for lightness, from black (0) to white (100); a* from green (−) to red (+); and b* from blue (−) to yellow (+). In various embodiments, the CIELAB color space encompasses i) red, green, blue, and alpha (RGBA) color models, as well as ii) cyan, magenta, yellow, and key (CMYK) color models. Within the CIELAB color space, the amount of numerical change in L*, a*, and b* approximately corresponds to a same amount of visually perceived change in the nipple 12 of FIG. 1. With respect to a predetermined white point stored within the memories 22 of the device of FIG. 2, the CIELAB model is independent of the device 14, in various embodiments.

In various embodiments, the color component of the nipple 12 of FIG. 1, as imaged by the device 14 of FIG. 2, is stored in the memories 22 of the device 14 as four bytes of information, one for each of the red (R), green (G), blue (b), and alpha (transparency). In various embodiments, once the red, green, blue, and alpha values are determined and stored in the memories 22 of the device 14, the memories 22 no longer contain other information about the nipple 12, such as its image. Instead, only the red, green, blue, and alpha values are retained and use to color match to the lipstick 26.

In various embodiments, the CIELAB color space is mapped onto a three-dimensional (3d) integer space for digital representation, with L* (i.e., the lightness value) comprising a darkest black at L*=0 and a brightest white at L*=100. In various embodiments, the color channels, a* and b*, comprise true neutral gray values at a*=0 and b*=0. In various embodiments, an a* axis comprises a green-red component, with green in a negative direction and red in a positive direction. In various embodiments, a b* axis comprises a blue-yellow component, with blue in a negative direction and yellow in a positive direction. In various embodiments, scaling and limits of the a* and b* axes can be in ranges of ±100, −128 to +127, and/or other. In various embodiments, the CIELAB color space approximates and/or roughly approximates human vision, such that the color component stored within the memories 22 of the device 14 approximate human visionary capabilities of the nipple 12 of the breast 10 of FIG. 1. The CIELAB color model is in the public domain.

In various embodiments, the device 14 of FIG. 2 is operated by the woman having the breast 10 of FIG. 1 with the nipple 12 color to be captured, or by an assistant, acquaintance, consultant, friend, partner, and/or other.

In various embodiments, hue, saturation, and lightness (HSL), and/or hue, saturation, and brightness (HSB), and/or hue, saturation, and value (HSV) are alternative representations of red, blue, green (RBG) color models, aligning with the way human vision perceives color-making attributes, as implemented by the computer componentry 18 of FIG. 2. These color models are typically cylindrical or conical or bi-conical geometries, with Hue (H), the angular dimension, starting at red primary at 0°, then passing through green primary at 120°, and the passing through blue primary at 240°, finally wrapping back to red at 360°. In each geometry, a central, vertical axis comprises achromatic, gray, and/or neutral colors, ranging from black at lightness (or value) 0, the bottom, to white at lightness (or value) 1, the top. In various embodiments, an allowable brightness window ranges from approximately 0.3 to 1.0, such as approximately 0.765, although brightness could be at any value from 0.0 to 1.0. Accordingly, if an imaged nipple 12 falls with predetermined bounds, the image of the nipple 12 is used for the color-matching; if it falls outside the predetermined bounds, it is not used, in various embodiments, and another image can be received until the pixels correspond to the desired conditions. In various embodiments, averages of retained pixels within the predetermined boundaries are retained in the memories 22.

In various embodiments, the user of the device 14 uses the imaging component 16 of FIG. 2 to capture an image (e.g., take a picture) of the nipple 12 of the breast 10 of FIG. 1, including, in various embodiments, the areola 13, which is often darker in color than the nipple 12. In various embodiments, the controllers 20 of the computer componentry 18 read pixels from a target color circle [e.g., in various embodiments, bounded by an hue upper bound of approximately 30°, plus or minus approximately 5°, and a hue lower bound of approximately 260°, plus or minus approximately 5°] about the image of the nipple 12, converting the RGB components of the captured imagery to HSL or HSB or HSV components. In various embodiments, the HSL or HSB or HSV components are stored within the memories 22. In various embodiments, the HSL or HSB or HSV components are stored within the memories 22 only if certain criteria are met; otherwise, the HSL or HSB or HSV components are not stored within the memories 22. In various embodiments, the image of the nipple 12 is only temporarily stored within the memories 22, as the HSL or HSB or HSV components are instead stored therewithin for further processing. In various embodiments, average values of pixels are stored within the memories 22.

In various embodiments, the color of the nipple 12 differs from the color of the areola 13, and the controllers 20 of the computer componentry 18 distinguish the two areas from one another as a result, such as by successively filtering the image. The filtering distinguishes various hues in the image to be able to identify various areas of the breast 10 distinct from the areola 13 distinct from the nipple 12.

In various embodiments, the imaging component 16 of the device 14 captures a color of the nipple 12 by having a user place the imaging component 16 onto, or a short distance apart from, the nipple 12. By activating the imaging component 16 of FIG. 2—e.g., by single or double clicking (or other) on a screen of the device 14—an image is captured in the memory 22 of the computer componentry 18, in various embodiments. In various embodiments, the imaging component 16 captures a point-and-shoot image of the nipple 12 of FIG. 1 in the lighting scenario to which the nipple 12 is exposed at the time the of the image capture. In various embodiments, the imaging component 16 of FIG. 2 is used to capture one or more images of the nipple 12 of FIG. 1, one or more of which are stored, and/or temporarily stored, within the memory 22 of the computer componentry 18 of FIG. 2, in various embodiments.

In various embodiments, so-called double tapping on a screen of the device 14 allows a user to operate the imaging component 16 when the device 14 is positioned in front of, and/or near, the nipple 12 of the breast 10, enabling at least one of physical or on-screen buttons for image capturing.

In various embodiments, the imaging component 16 scans the nipple 12 as it does so with, for example, a quick response (QR) code, employing analogous techniques, incorporated by reference hereinto.

In various embodiments, the device 14 includes the imaging component 16 on the first side 14a and the second side 14b thereof. In various embodiments, the device 14 comprises multiple imaging components 16. In various embodiments, the image and/or images of the breast 10 are captured by the one or more imaging components 16.

In various embodiments, the imaging component 16 on the first side 14a of the device 14 is used to adjust the light in which the image of the nipple 12 is captured, such as by enabling a user to change a color of a screen of the device 14, which provides lighting as it faces the nipple 12, such as from warm to cold through a slider on the screen of the device 14. In various embodiments, the changing color of the lighting cast upon the nipple 12 enables a woman to mimic various environments in which she wears the lipstick, including color-matching the lipstick to different colors of the nipple 12 in, and/or, under various lighting conditions. Different colors of the lipstick.

In various embodiments, the memory 22 of the computer componentry 18 captures and/or retains a moving display of what the imaging component 16 is capturing, enabling the user to position the device 14 about the nipple 12 until the imaging component 16 is activated, after which the real-time display and/or image facing the imaging component 16 is deactivated and/or a screen of the device 14 is switched to a solid warm/cold color, as chosen by the operator/user.

In various embodiments, the operator/user captures the image of the nipple 12 (including via still and/or video images) in the memory 22 of the computer componentry 18, with reflected light and displays on the screen of the device 14. Once the operator/user of the device 14 accepts the image of the nipple 12, the controller 20 determine the average color in the RGBA color model using algorithms stored in the memories 22 and controlled by the controller 20, in various embodiments.

In various embodiments, the image (and/or images) of the nipple 12 captured in the memory 22 is deleted and only color component data is retained in the memory 22. In various embodiments, the image of the nipple 12 is not saved or transmitted anywhere other than to and/or from the memory 22 of the computer componentry 18, and only for the purpose of detecting and storing the color components of the nipple 12.

In various embodiments, the controller 20 is programmed and/or used to determine a solid color as the color of the nipple 12 while not using the alpha component A, alternatively adjusting the RGB values so that the alpha component A is equal to 1.0—that is, in various embodiments, the alpha component A is used for transparency, which is the ability to lay one image over another image but still see some of the background image with lesser background to show. In various embodiments, the controller 20 to compare the color of the nipple 12 to other solid colors expressed as RGB.

In various embodiments, the controller 20 applies a formula used in computer-graphic algorithms. In various embodiments, an average color provides a reference color in RGB space that the controller 20 uses to formulate a color for the lipstick 26 of FIG. 3, matching and/or closely matching, resembling, and/or corresponding to the natural color of the nipple 12 of the breast 10 of FIG. 1.

In various embodiments, the controller 20 maps the data captured by the imaging component 16 of 0 to other standards, such as Pantone, to communicate the color to other systems.

In various embodiments, when the color of the lipstick 26 shown in FIG. 3 is chosen to match the color of the nipple 12 of FIG. 1 as captured by the imaging component 16 of the device 14 of FIG. 2, beauty is enhanced when applied to an operator/user's lips.

In various embodiments, a lipstick 26 is ordered/purchased from a manufacturer to match the color identified by the controller 20.

In various embodiments, the lipstick 26 is ordered/purchased from the manufacturer through a software application (or other) stored within, programmed into, and/or assessed via the controller 20 and/or memory 22 of the computer componentry 18.

In various embodiments, the application that determines the color of the nipple 12 is used to order a lipstick 26 in that color, and/or close thereto.

In various embodiments, a manufacturer maintains various collections of lipstick colors in stock, and the controller 20 calculates a closeness, or distance of each stock color, to the reference color, such as follows:

a. in various embodiments, the distance is a physical distance between points in 3-D space if the two color values are plotted on an XYZ cartesian coordinate system, where XYZ correspond to R, G, and B values, respectively; however, in various embodiments, a closest distance in this color space may not correlate with closest matching color that an eye may, or would, would be inclined to choose;

b. in various embodiments, the controller 20 converts the RGB standard to the CIELAB standard, which is correlated as a color space that matches human interpretations of color; and in various embodiments, the controllers 20 perform this conversion through empirical numerical transformations; and c. in various embodiments, the controller 20 plots the points in the CIELAB space and calculates a distance for each stock color from the reference color.

Once the controller 20 calculates the distances, it displays the inverse as a Pareto chart, with each bar in the particular stock color it represents, in various embodiments. In various embodiments, the largest bars are the closest colors, with the reference color as 100%. In various embodiments, an operator or user see or views a total stock palette, as more than one color may be close to a reference color.

In various embodiments, the operator or user orders the reference color using the software application, and/or other.

In various embodiments, the operator or user orders the closest stock color(s) to the imaged colors.

In various embodiments, the color of the nipple 12 of FIG. 1 is aligned with, correlated with, and/or color-matched to the color of the lipstick 26 shown in FIG. 3.

In various embodiments, the color of the nipple 12 of FIG. 1 is aligned with, correlated with, and/or color-matched to the color of the lipstick 26 shown in FIG. 3 as closely as desired.

In various embodiments, the color of the nipple 12 of FIG. 1 is aligned with, correlated with, and/or color-matched to the color of the lipstick 26 shown in FIG. 3 as closely as possible.

Figure 4:
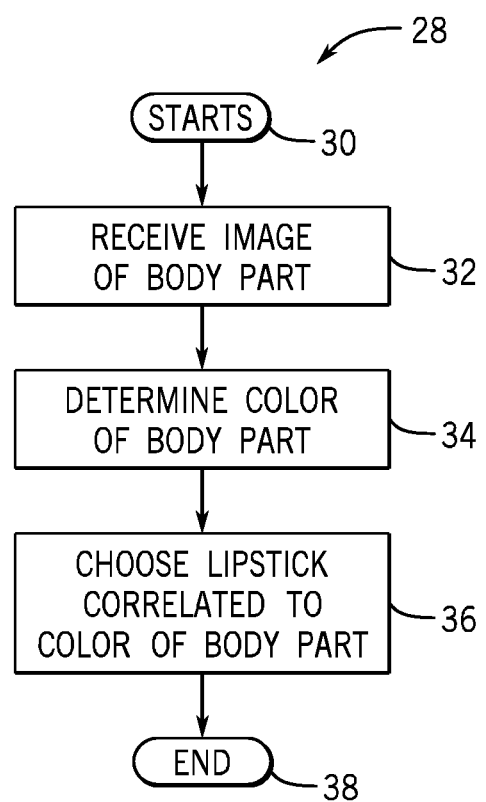
FIG. 4 illustrates a simplified method for choosing a color of lipstick correlated to a color of a body part, such as a nipple, in various embodiments.

Referring now to FIG. 4, an embodiment of a method 28 begins in a step 30, after which flow continues to a step 32, in which an image of a body part, such as a nipple 12 of FIG. 1, is received, such as by an imaging component 16 of a device 14 of FIG. 2, such as by a camera of a cell phone, respectively. Thereafter, the color of the body part is determined in a step 34, after which flow continues to a step 36, in which a lipstick color, coloration, and/or pigmentation is chosen, had made, identified, made, manufactured, picked, and/or selected, etc. as correlated to the color of the body part that was imaged. Thereafter, the method 28 ends in a step 38.

In various embodiments, components, methods, and systems of the forgoing are provided.

In various embodiments, advantages, benefits, improvements, and solutions, etc. are described with regard to specific embodiments. Furthermore, connecting lines shown in the various figures are intended to represent exemplary functional relationships and/or direct/physical couplings between the various elements. It should be noted that many additional and/or alternative functional relationships or direct/physical connections may be present in a practical system. However, the advantages, benefits, improvements, solutions, etc., and any elements that may cause any advantage, benefit, improvement, solution, etc. to occur, or become more pronounced, are not to be construed as critical, essential, or required elements or features of this provisional disclosure.

In various embodiments, the scope of this provisional disclosure is to be limited by nothing other than final and/or issued non-provisional claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural, and vice-versa. Any ranges and ratio limits disclosed herein may also be combined.

In various embodiments, if a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching may be used throughout the figures to denote different parts, but not necessarily to denote the same or different materials. Like depictions and numerals also generally represent like elements.

In various embodiments, any steps recited in any of the method or process descriptions may be executed in any order and are not necessarily limited to the order presented. Furthermore, any reference to singular elements, embodiments, and/or steps includes plurals thereof, and any reference to more than one element, embodiment, and/or step may include a singular one thereof. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

In various embodiments, any reference to attached, connected, fixed, or the like may include full, partial, permanent, removable, temporary and/or any other possible attachment options. Additionally, any reference to without contact (or similar phrases) may also include reduced contact or minimal contact. Surface shading lines may be used throughout the figures to denote different areas or parts, but not necessarily to denote the same or different materials. In some cases, reference coordinates may or may not be specific to each figure.

In various embodiments, apparatuses, methods, and systems are described herein. In the detailed description herein, references to "one embodiment," "an embodiment," "various embodiments," etc., indicate that the embodiment described may include a particular characteristic, feature, or structure, but every embodiment may not necessarily include this particular characteristic, feature, or structure. Moreover, such phrases may not necessarily refer to the same embodiment. Further, when a particular characteristic, feature, or structure is described in connection with an embodiment, it is submitted that it is within the knowledge of one skilled in the art to affect such characteristic, feature, or structure in connection with other embodiments, whether or not explicitly described. After reading this description, it will or should be apparent to one skilled in the relevant art(s) how to implement this disclosure in alternative embodiments.

In various embodiments, no component, element, or method step in the present disclosure is intended to be dedicated to the public, regardless of whether the component, element, or method step is explicitly recited in the claims. No claim element is intended to invoke 35 U.S.C. § 112(f) unless the element is expressly recited using the phrase "means for." As used herein, the terms "comprises," "comprising," or any other variation thereof, are intended to cover non-exclusive inclusion, such that an apparatus, article, method, or process that comprises a list of elements does not include only those elements, but it may also include other elements not expressly listed or inherent to such apparatus, article, method, or process.

What is claimed is:

1. A method of color-matching a body part to a lip product, comprising:
   receiving an image of the body part;
   determining a color of the body part; and
   choosing a color of the lip product that corresponds to the color of the body part,
   wherein the body part is a nipple of a breast, and
   wherein the color of the nipple of the breast is distinguished from a color of an areola of the breast in order to the determine the color of the nipple.

2. The method of color-matching of claim 1, wherein the lip product comprises lipstick.

3. The method of color-matching of claim 1, wherein the color of the body part comprises three bytes of information, comprising its red, green, and blue values.

4. The method of color-matching of claim 1, wherein the color of the body part comprises four bytes of information, comprising its red, green, blue, and transparency values.

5. The method of color-matching of claim 1, wherein the image of the body part is received from a hand-held device.

6. The method of color-matching of claim 5, wherein the hand-held device is a cell phone.

7. The method of color-matching of claim 1, further comprising:
   using a hand-held device to capture the image of the body part.

8. The method of color-matching of claim 1, further comprising:
   discarding the image of the body part after the color of the body part is determined.

9. The method of color-matching of claim 1, wherein the color of the lip product matches the color of the body part.

10. The method of color-matching of claim 1, wherein the color of the lip product is chosen from a stock of colors of the lip products.

11. The method of color-matching of claim 1, further comprising:
    receiving multiple images of the body part.

12. The method of color-matching of claim 1, further comprising:
    receiving multiple images of the body part under various lighting conditions of the body part.

13. The method of color-matching of claim 1, wherein the color of the body part is determined using an algorithm related to the body part and to the lip product.

14. A method of color-matching a body part to a lip product, comprising:
    receiving an image of the body part;
    determining a color of the body part; and
    choosing a color of the lip product that corresponds to the color of the body part,
    The method of color-matching of claim 1, wherein a computing device is configured to receive the image of the body part, a computer algorithm is configured to determine the color of the body part, and the computing device is configured to determine the color of the lip product.

15. A method of color-matching a body part to a lip product, comprising:
    receiving an image of the body part;
    determining a color of the body part; and
    choosing a color of the lip product that corresponds to the color of the body part, The method of color-matching of claim 1, wherein a user uses a computing device to image the body part, a computer algorithm is configured to determine the color of the body part, and the computing device is configured to determine the color of the lip product.

* * * * *